United States Patent [19]
Anderson

[11] 3,715,913
[45] Feb. 13, 1973

[54] AQUATIC SEDIMENT AND POLLUTION MONITOR

[76] Inventor: Roger Y. Anderson, 5014 Guadalupe Tr., N.W., Albuquerque, N. Mex. 87107

[22] Filed: March 25, 1971

[21] Appl. No.: 127,891

[52] U.S. Cl. .............73/61 R, 73/170 A, 73/425.4 R
[51] Int. Cl. ...............................................G01n 1/20
[58] Field of Search.......73/61 R, 170 A, 170 R, 171, 73/28, 425.4 R

[56] References Cited

UNITED STATES PATENTS 2,841,012   7/1958   Romer..........................73/425.4 R X
3,296,858   1/1967   Doury et al..........................73/171 X Primary Examiner—Louis J. Capozi
Assistant Examiner—Joseph W. Roskos
Attorney—Philip M. Hinderstein

[57] ABSTRACT

An aquatic sediment and pollution monitor adapted to be positioned in a body of water comprising an elongated, vertically alignable, collecting tube having an open upper end and a closed lower end for collecting, over a long period of time, the natural materials and polluting substances that accumulate in the body of water. A generally funnel-shaped magnifying cone is positioned with the small diameter end thereof extending into the open end of the collecting tube to magnify the amount of sediment and pollution collected. A baffle is positioned in the magnifying cone adjacent the large diameter end thereof for minimizing turbulence in the collecting tube and for preventing entrance thereinto of large organisms. Means are also provided for automatically marking, at regular intervals, the quantity of sediment and pollution accumulated in the collecting tube during such intervals.

15 Claims, 8 Drawing Figures

PATENTED FEB 13 1973

INVENTOR.
ROGER Y. ANDERSON
BY
ATTORNEYS

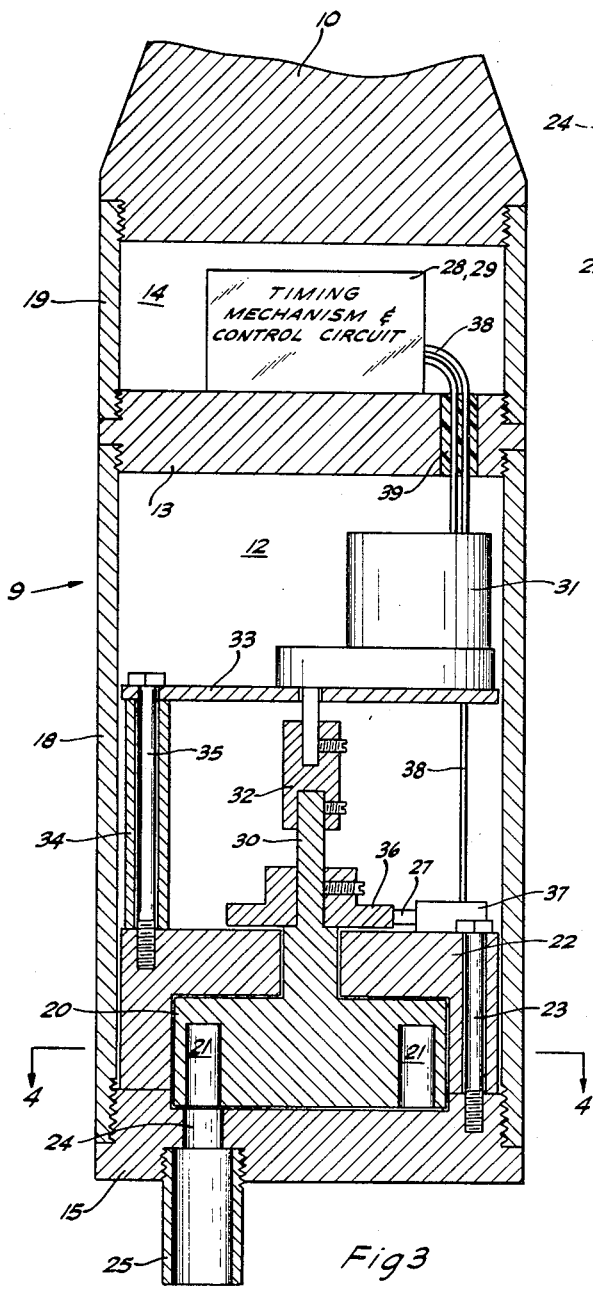
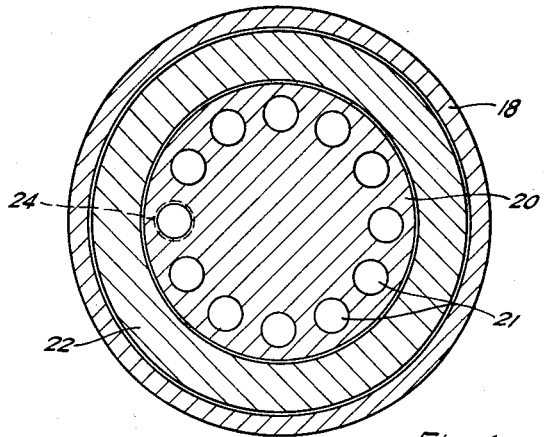
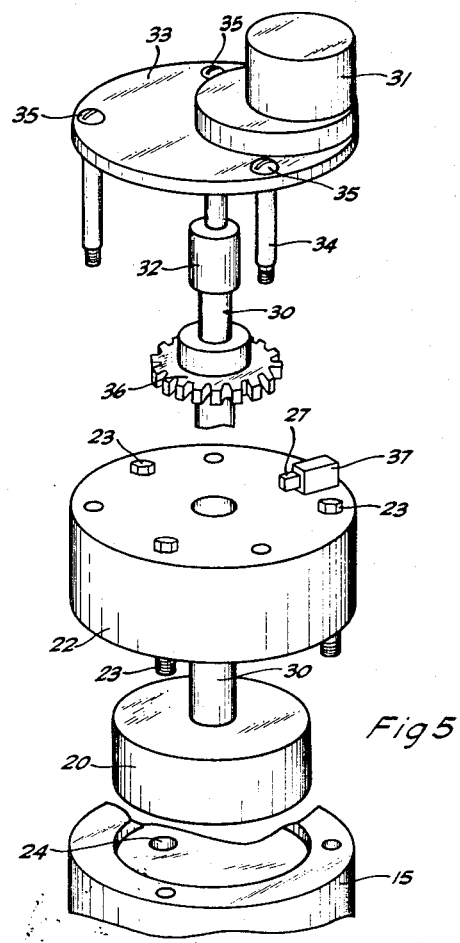
INVENTOR.
ROGER Y. ANDERSON
ATTORNEYS

INVENTOR.
ROGER Y. ANDERSON
BY
Anderson & Silber
ATTORNEYS

AQUATIC SEDIMENT AND POLLUTION MONITOR

BACKGROUND OF THE INVENTION

1. Field of the Invention

The present invention relates to the collection and measurement of the natural materials and polluting substances that accumulate in bodies of water, such as lakes, lagoons, reservoirs, estuaries and oceans and, more particularly, to apparatus adapted to be positioned in a body of water for collecting natural sediment and polluting substances for the purpose of determining their effects on the condition of the water body.

2. Description of the Prior Art

A wide variety of materials and substances which are the by-products of man's activities are eventually carried into lakes, reservoirs, lagoons, bays, estuaries and the oceans. Such materials generally remain suspended for some period of time, are sometimes acted upon by organisms within the water body and eventually settle to the bottom of the water body. Some of these substances, such as phosphate, nitrate, mercury, lead, DDT, PCB, as well as some bacteria, are known to have a harmful effect on the life or condition of the water body. Also, by accumulating in the tissues of fish or other organisms, such substances may also have a harmful effect on human life.

The amount of potentially harmful substances that is accumulating in the water bodies of the world is creating a serious pollution problem, whose magnitude is so great that many independent scientists and private and governmental institutions have called for regular programs of sampling and monitoring aquatic sediment and pollution to determine the level of pollution and to detect changes in the volume or rate of pollution. See, for example, the chapter on monitoring in the report of the Study of Critical Environmental Problems in Man's Impact on the Global Environment, MIT Press, 1970.

Present aquatic sampling and monitoring systems have many problems associated therewith. The most common technique for the periodic sampling of water and suspended matter makes use of plankton nets and sampling bottles. The collected material is returned to the laboratory for analysis by standard chemical and biological methods. However, such direct water sampling has several serious limitations and disadvantages associated therewith. In the first instance, such techniques require frequent trips to the collecting site which is often in a remote locality or is accessible only after considerable travel by boat. Another disadvantage is that the material obtained during such trips represents the condition of the water body only at the moment it is sampled and such techniques do not provide a continuous record.

A few reported measuring or monitoring studies have placed a collecting box or bottle directly on the bottom of a water body or suspended from a cable or frame. Such collecting device is then recovered after a short period of time, generally after one month. While this technique permits a continuous record, it requires large containers and frequent visits to the collecting site. In addition, the material collected is generally only a thin film on the bottom of the collecting vessel, which film is easily disturbed by organisms, such as fish.

Attempts have also been made to use funnels to magnify the rate of accumulation of aquatic sediment and pollution. However, these attempts have been generally unsatisfactory because turbulence caused by currents in the water body enters the large opening provided by the funnel and disturbs and distorts the quantity of material entering the collecting vessel. In addition, the accumulated material is susceptible to being acted upon by organisms that scavenge and burrow and mix the material so that the time relationships are destroyed. Finally, this method has the disadvantage of requiring frequent trips to the collecting site.

SUMMARY OF THE INVENTION

According to the present invention, there is provided an aquatic sediment and pollution monitor which overcomes all of the problems discussed above with respect to prior art systems. According to the present invention, a collecting vessel is adapted to be positioned in a body of water and left there for a substantial period of time, thereby eliminating the necessity for frequent trips to the collecting site. In addition, by leaving a collecting vessel in the water body for a long period of time, the material obtained provides a continuous record of substances accumulating in the water body. The present structure includes, in addition to the collecting vessel, apparatus for magnifying the rate of accumulation of materials as well as apparatus for minimizing turbulence in the collecting vessel and for preventing entrance into the collecting vessel of large organisms. As a result, the material collected represents an accurate sample of sediment and pollution in the water body. Also, the present collecting and monitoring system incorporates a dispensing device for automatically marking, at regular intervals, the quantity of sediment accumulated in the collecting vessel during such intervals. Accordingly, the present device makes it possible to establish automated monitoring stations in many water bodies and permits the identification of the rate of pollution as well as the general condition or health of the water body.

Briefly, the present aquatic sediment and pollution monitor which is adapted to be positioned in a body of water comprises an elongated, vertically alignable, collecting tube having an open upper end and a closed lower end for collecting, over a long period of time, the natural materials and polluting substances that accumulate in the body of water. A generally funnel-shaped magnifying cone is positioned with the small diameter end thereof extending into the open end of the collecting tube to magnify the amount of sediment and pollution collected. A baffle is positioned in the magnifying cone adjacent the large diameter end thereof for minimizing turbulence in the collecting tube and for preventing entrance thereinto of large organisms. Means are also provided for automatically marking, at regular intervals, the quantity of sediment and pollution accumulated in the collecting tube during such intervals.

It is, therefore, an object of the present invention to provide a novel aquatic sediment and pollution monitor.

It is a further object of the present invention to provide a sediment and pollution collecting and measuring device that operates over a long period of time without the need for frequent, periodic visits to the collecting site.

It is a still further object of the present invention to provide an aquatic sediment and pollution monitor including apparatus for magnifying or amplifying the volume of accumulated natural materials and pollutants and for protecting and preserving the accumulated materials from the disturbing effects of organisms and currents.

It is another object of the present invention to provide an aquatic sediment and pollution monitor including a dispensing device for automatically dividing the accumulated materials and pollutants into known time intervals which serve as a basis for the collection, sampling and analysis of the materials.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 3 is an enlarged, sectional view taken through the center of the dispensing device incorporated within the structure of FIGS. 1 and 2;

FIG. 4 is a sectional view taken along the line 4—4 in FIG. 3;

FIG. 5 is a perspective view of a portion of the dispensing device of FIG. 3;

DESCRIPTION OF THE PREFERRED EMBODIMENT

Figure 1:
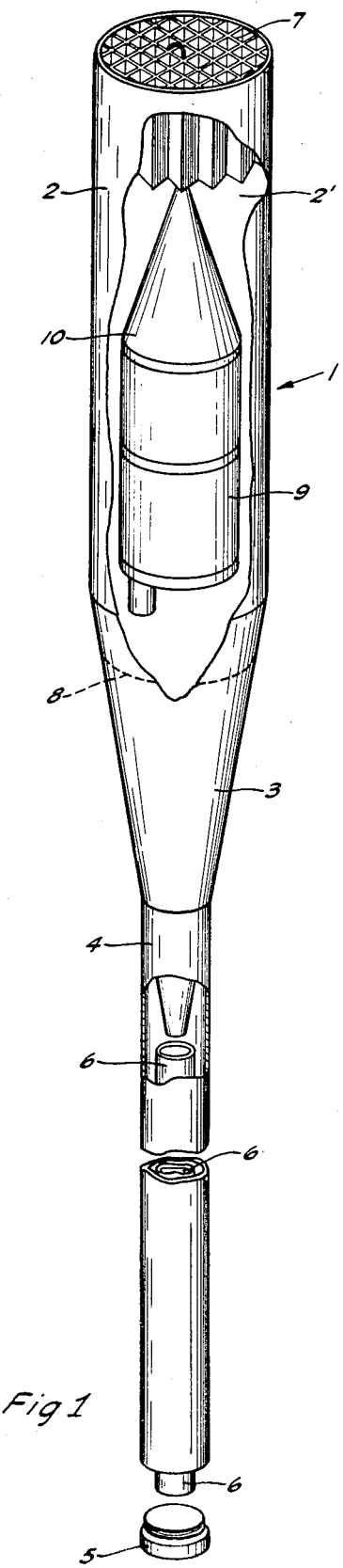
FIG. 1 is an isometric view, partially cut away, of a preferred embodiment of aquatic sediment and pollution monitor.
Figure 2:
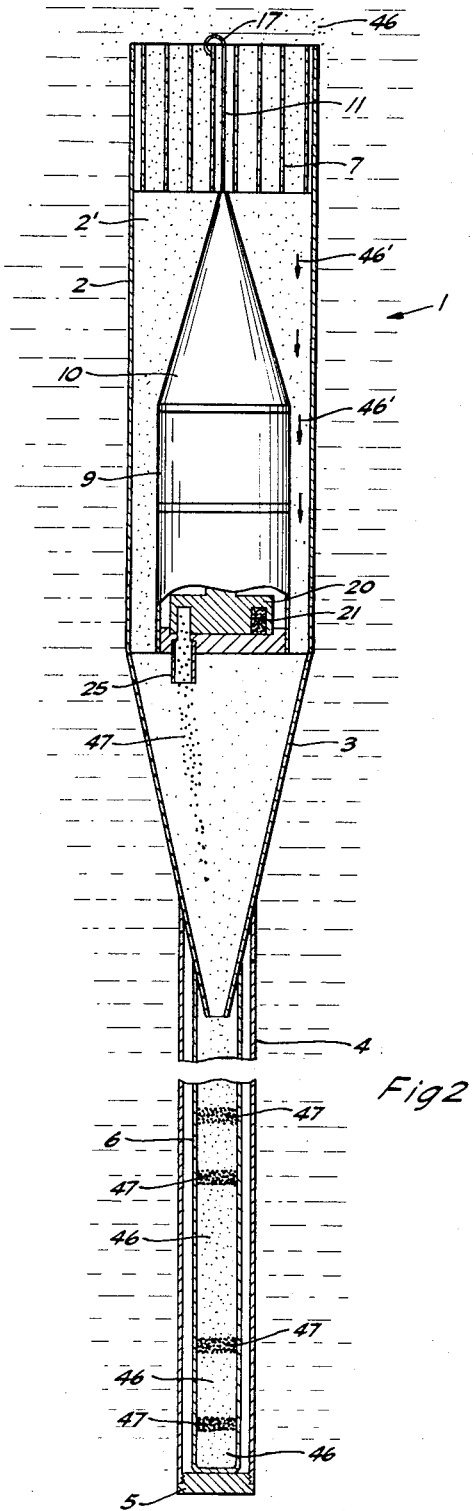
FIG. 2 is a longitudinal sectional view of the apparatus of FIG. 1 taken through the center thereof.

Referring now to the drawings and, more particularly, to FIGS. 1 and 2 thereof, there is shown a preferred embodiment of aquatic sediment and pollution monitor, generally designated 1. Monitor 1 includes a collecting tube 6 having an open upper end and a closed lower end for collecting and storing, over a relatively long period of time, aquatic sediment and pollutants. Collecting tube 6 is positioned within a housing tube 4 which is sealed at its open lower end by a threaded cap 5. The open upper end of housing tube 4 receives and is connected adjacent the small diameter end of a magnifying cone 3. As shown most clearly in FIG. 2, the small diameter end of magnifying cone 3 extends into collecting tube 6 which is held in such position by threaded cap 5.

Connected to, and preferably made integral with, the upper, large diameter end of magnifying cone 3 is a hollow housing 2 which defines an entry chamber 2' for monitor 1. The upper end of housing 2 is open and positioned to receive the materials and substances 46 suspended in a body of water. Such materials and substances pass through chamber 2' and magnifying cone 3 into collecting tube 6 where they are stored for analysis at a later time. The rate of magnification is determined by the ratio of the area of chamber 2' to the area of collecting tube 6.

In order to isolate the accumulated materials and substances from the disturbing effects of water currents and organisms, chamber 2' has positioned therein, at the upper end thereof, a cell-like network of baffles 7 of such proportions that the length of each cell of baffle 7 is approximately two to three times the width of the opening of the cell. This close spacing of the cell-like compartments of baffle 7 causes the open end of chamber 2' to behave as a surface over which currents flow essentially without turbulence at the same time that suspended matter moves down through the cells of baffle 7. Such construction substantially increases the accuracy of the collection process. Baffle 7 also eliminates the disturbing effects of large organisms or currents inside magnifying chamber 3 which would loosen adhered material and distort the rate of accumulation of suspended matter.

Collecting tube 6, housing tube 4 and magnifying cone 3 are preferably filled, to the level designated by numeral 8, with a chemically pure liquid brine solution, such as sodium chloride at a concentration of 20 percent. Such a brine solution preserves the materials collected within tube 6 as well as eliminating any small organisms which would collect in tube 6.

According to the preferred embodiment of the present invention, aquatic sediment and pollution monitor 1 includes a dispensing device, generally designated 9, for automatically marking, at regular intervals, the quantity of sediment accumulated in collecting tube 6 during such intervals. According to the embodiment of FIGS. 1 and 2, dispensing device 9 includes an inverted, generally funnel-shaped shield 10 made integral with the top thereof, dispensing device 9 and shield 10 being suspended within chamber 2' by means of a cable 11, one end of which is connected to the apex of shield 10 and the other end of which is connected to baffle 7, such as by a hook 17. As will be discussed in greater detail hereinafter, dispensing device 9 includes a magazine 20 which contains many small dispensing chambers 21, each of which contains a suitable, inert marking material 47 having a density greater than water. Any one of chambers 21 is adapted to be aligned with a dispensing tube 25 which extends through the bottom of dispensing device 9 and into magnifying cone 3. By periodically rotating, at regular intervals, magazine 20, the inert material contained within dispensing chambers 21 may settle in collecting tube 6 to provide layers of marking material 47 between layers of sediment 46.

Referring now to FIGS. 3-5, a preferred embodiment of dispensing device 9 includes first and second coaxial tubular bodies 18 and 19 which are internally threaded at opposite ends thereof. The lower end of body 18 is sealed by a cap 15 whereas the upper end of body 19 is sealed by a cap which may be made integral with shield 10, as shown. A bulkhead 13 serves the several functions of sealing the upper and lower ends of bodies 18 and 19, respectively, as well as joining bodies 18 and 19 into a unitary structure.

Body 18 in combination with cap 15 and bulkhead 13 defines a housing chamber 12 whereas body 19 in combination with cap 16 and bulkhead 13 define a timing chamber 14. Caps 15 and 16 and bulkhead 13 may include suitable sealing devices, such as O-rings, to render chambers 12 and 14 watertight.

Positioned within the lower end of housing chamber 12, and secured to housing chamber cap 15 by suitable bolts 23, is a cylindrical housing block 22. The lower end of housing block 22 and the upper end of housing cap 15 have chambers therein for receiving magazine 20. As shown most clearly in FIG. 4, magazine 20 contains a plurality of small dispensing chambers 21 which are uniformly spaced around magazine 20, equidistant from the axis of rotation thereof.

Referring back to FIGS. 3 and 5, housing chamber cap 15 has a hole 24 extending therethrough, one end of hole 24 being positioned to register with any one of chambers 21 in magazine 20 for conducting the contents thereof therefrom. The other end of dispensing hole 24 receives a dispensing tube 25 which may extend into magnifying cone 3, as shown in FIGS. 1 and 2.

A drive shaft 30 connects magazine 20 with a motor 31 by means of a shaft connector 32. Motor 31 may be mounted on a platform 33 which may be supported by spacers 34 and connected to housing block 22 with screws 35.

Drive shaft 30 of magazine 20 has mounted thereon a timing cam or gear 36 which contains the same number and spacing of cogs as the number and spacing of dispensing chambers 21 in magazine 20, timing cam 36 being positioned between housing block 22 and shaft connector 32. A single pole, double throw switch 37 may be affixed to housing block 22 in such a position that the arm 27 thereof engages the cogs on timing cam 36. In this manner, switch 37 is placed in one position or the other, depending upon whether arm 27 is in contact with a cog or is positioned within the space between adjacent cogs.

Timing chamber 14 may contain a timing mechanism 28 together with control circuitry 29 for use with motor 31 and switch 37. Electrical wires 38 which extend through an insulating seal 39 in bulkhead 13 conduct electrical signals between switch 37 and motor 31 in housing chamber 12 and timing mechanism 28 and control circuitry 29 in timer chamber 14. As will be explained more fully hereinafter, timing mechanism 28 may be a commercially available timer or a timer constructed from a DC clock and batteries.

Figure 6:
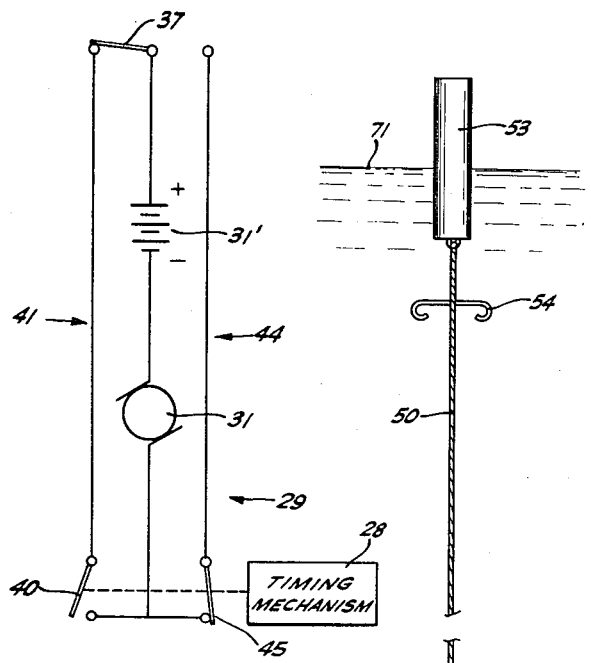
FIG. 6 is a diagramatic representation of one circuit which may be used to actuate the dispensing device of FIGS. 3-5.

Referring now to FIG. 6, control circuitry 29 may include first and second series circuits 41 and 44, each of which includes motor 31, a battery 31' and switch 37. Switch 37 is connected in control circuit 29 so that it alternately closes circuits 41 and 44 depending upon whether arm 27 is in contact with a cog on timing cam 36 or a space between adjacent cogs. Circuits 41 and 44 also include mechanical switches 40 and 45, respectively, which are mechanically coupled to timing mechanism 28 in such a manner that one switch is always open and the other switch is always closed.

The operation of dispensing device 9 may be understood with reference to FIGS. 3–6. In the condition of circuits 41 and 44, shown in FIG. 6, neither circuit is closed and motor 31 is de-energized. After a preset interval of time, timing mechanism 28 is activated to close switch 40 and open switch 45. In this position, a series circuit is completed between battery 31' and motor 31 via switches 40 and 37 and motor 31 is activated to rotate magazine 20 and timing cam 36. Magazine 20 and timing cam 36 continued to turn until switch 37 switches from circuit 41 to circuit 44. Since switch 45 in circuit 44 is now open, motor 31 is de-energized and stops. The relationship of timing cam 36 and magazine 20 is such that magazine 20 stops with the next dispensing chamber in position over dispensing hole 24. After the preset interval of time provided by timing mechanism 28, switches 40 and 45 return to the positions shown in FIG. 6 and circuit 44 is activated. Accordingly, motor 31 is energized to rotate magazine 20 and timing cam 36 until the next dispensing chamber 21 moves into position over dispensing hole 24. At this time, switch 37 moves to the position shown in FIG. 6 and the next cycle is complete.

Referring now primarily to FIG. 2, the complete operation of aquatic sediment and pollution monitor 1 and dispensing device 9 may be best understood. More specifically, dispensing chambers 21 in magazine 20 contain an inert marking material, such as plastic granules, with a density greater than water. Suspended matter 46 in the water body moves by gravity past baffles 7, around shield 10 and dispensing device 9, as shown by arrows 46', and is deflected by magnifying cone 3 into collecting tube 6 where it settles as a layer of sediment. At periodic, regular intervals, as determined by timing mechanism 28, magazine 20 is rotated to align one of dispensing chambers 21 with dispensing hole 24 and dispensing tube 25. The marking material 47 within the dispensing chamber 21 passes through dispensing hole 24 and tube 25 into magnifying cone 3 where it is deflected into collecting tube 6. Such marking material 47 settles as a distinct layer on top of the previously accumulated suspended matter 46. Accordingly, after a given period of time, which may be several months or several years, monitor 1 may be recovered whereupon collecting tube 6 will contain suspended matter 46 marked off by layers of material 47 that correspond to the preset interval of timing mechanism 28. The quantity of suspended matter 46 that has accumulated between layers of marking material 47 is thus a measure of the rate of accumulation of natural materials and associated polluting substances so that the present aquatic sediment and pollution monitor thereby provides a continuous record of changes taking place within the water body.

Figure 7:
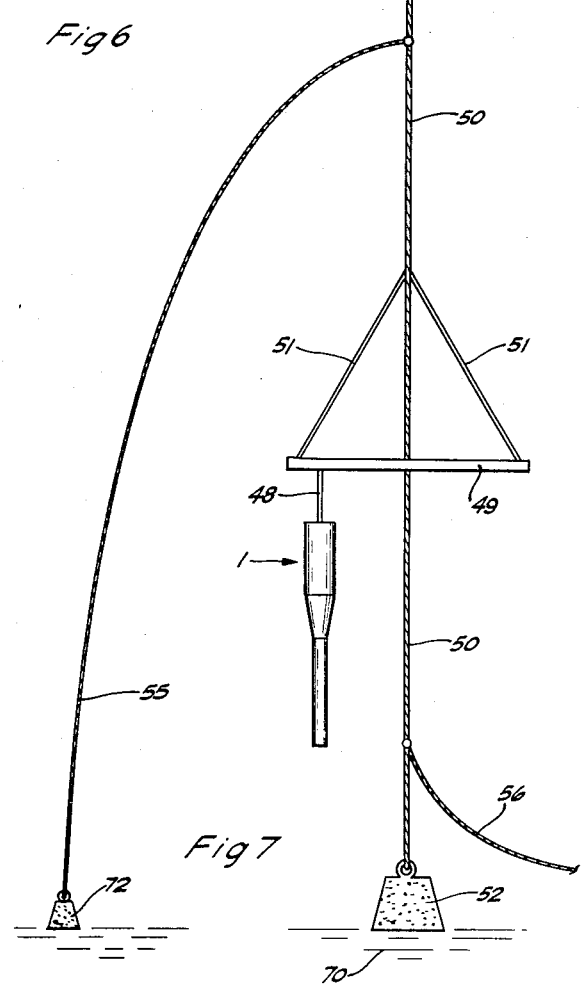
FIG. 7 is a front elevation view of a first embodiment of apparatus for mounting and supporting the structure of FIGS. 1-5 in a body of water.

Referring now to FIG. 7, aquatic sediment and pollution monitor 1 having dispensing device 9 positioned therein may be suspended by a mounting cable 48 from a cross-bar 49 which is affixed to a main cable 50 and secured with stabilizing cables 51. Main cable 50 may be suspended between an anchor 52 on the floor 70 of a water body 71 and a buoy 53 floating on or beneath the surface of water body 71. Several techniques may be utilized to recover monitor 1. For example, buoy 53 may include a recovery hook 54 or a snag line 55 may be connected between cable 50 and an anchor 72. Alternatively, a bottom cable 56 may be connected between cable 50, adjacent anchor 52, and a known position.

Figure 8:
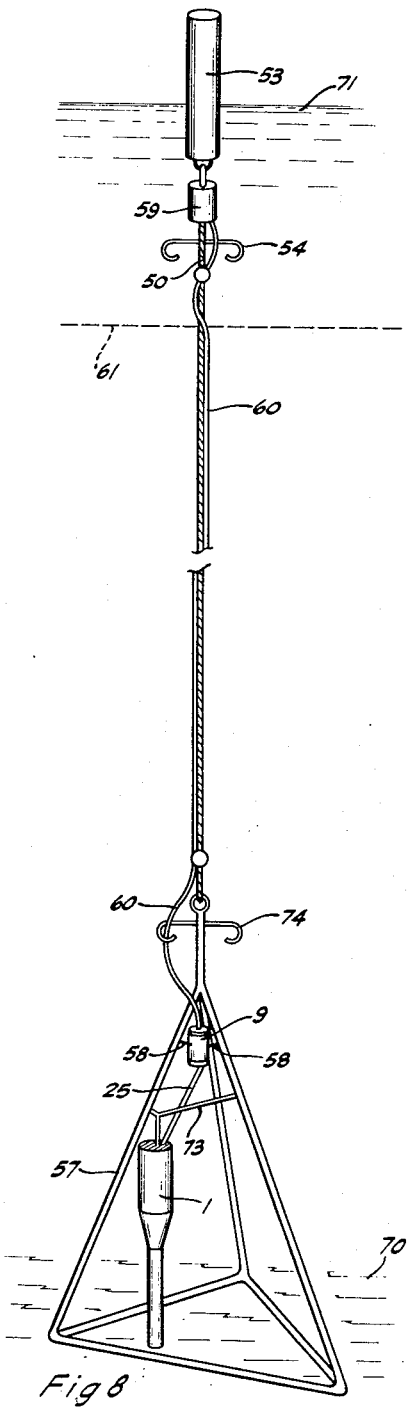
FIG. 8 is a perspective view of a second embodiment of apparatus for mounting and supporting the structure of FIGS. 1-5 in a body of water.

Referring to FIG. 8, aquatic sediment and pollution monitor 1 may be suspended by a mounting cable 73 from a pyramidal frame 57 which rests on floor 70 of water body 71. Pyramidal frame 57 may be provided with a recovery hook 74 adjacent the top thereof. According to the embodiment of FIG. 8, dispensing device 9 is positioned outside of monitor 1 and is secured to frame 57 by mounting arms 58. In this case, dispensing tube 25 extends from the bottom of dispensing device 9 into collecting device 1.

In the embodiment of FIG. 8, timing mechanism 28 is replaced by a thermostat chamber 59 connected to the bottom of buoy 53 below the surface of water 71. A thermostat within chamber 59 is connected by a waterproof electrical cable 60 to dispensing device 9. Chamber 59 is located above the thermocline 61 in the water body, for reasons which will appear hereinafter.

Referring now to FIGS. 6 and 8, a thermostat is placed in thermostat chamber 59 and substituted for timing mechanism 28 and switches 40 and 45. When the temperature of water body 71 rises, in the spring, the thermostat would close circuit 41 causing the release of marking material 47. When the temperature of the water body falls, in the fall, the thermostat opens circuit 41 and closes circuit 44 again causing the release of marking material. The two thermostat settings which will cause the opening and closing of circuits 41 and 44 are set several degrees apart so that only temperature changes of a seasonal magnitude will operate the circuit in a cyclic manner. Accordingly, a single thermostat pair will indirectly cause two layers of marking material to be placed in collecting tube 6 each year. The actual temperature settings of the thermostat pair will determine the month or time of release of marking material 47. Furthermore, the use of two or more thermostat pairs will cause additional layers of marking material to be deposited at known temperature relationships to the water body.

It can, therefore, be seen that in accordance with the present invention, there is provided an efficient apparatus for magnifying, collecting, preserving and determining the volume or quantity of natural materials sand polluting substances in bodies of water. The present aquatic sediment and pollution monitor serves to completely replace the inefficient structures of prior art collecting and measuring methods. Not only is the present apparatus more efficient by permitting the collection of increased quantities of material with less distortion of the rate of accumulation, but it has the added advantage of isolating the collected material from the disturbing effects of organisms. The present aquatic sediment and pollution monitor, by automatically marking the time intervals of collection and accumulation, completely replaces the prior art technique of recovering the sampling equipment after each measured time period. Furthermore, the present apparatus, when used in conjunction with a thermostat, will relate the quantity or change of a particular substance or organism to the temperature conditions of the water body. The increased efficiency of the present invention makes it possible to deploy several fixed monitoring stations in the same body of water to thereby plot and locate areas of greatest concentration of pollutants to permit tracing of the source of such substances and pollutants.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. An aquatic sediment and pollution monitor adapted to be positioned in a body of water comprising:
    an elongated, vertically alignable, collecting tube having an open upper end and a closed lower end;
    a generally funnel-shaped magnifying cone positioned with the small diameter end thereof extending into said open end of said collecting tube;
    baffle means positioned adjacent the large diameter end of said magnifying cone for minimizing turbulence in said collecting tube and for preventing entrance into said collecting tube of large organisms while allowing solids and small organisms to enter said collecting tube; and
    means for automatically marking, at regular intervals, the quantity of sediment accumulated in said collecting tube during such intervals.

2. An aquatic sediment and pollution monitor according to claim 1 wherein said marking means comprises:
    a plurality of dispensing devices, each of said dispensing devices containing a marking material;
    means for periodically activating different ones of said dispensing devices to release the marking material contained therein; and
    means for conducting said marking material from said dispensing devices into said collecting tube.

3. An aquatic sediment and pollution monitor according to claim 2 wherein said means for activating comprises:
    a conventional timer for activating said dispensing devices after a preset time interval.

4. An aquatic sediment and pollution monitor according to claim 2 wherein said means for activating comprises:
    a thermostat positioned within said body of water for sensing changes in temperature thereof and for activating said dispensing devices when said temperature passes through at least one preset level.

5. An aquatic sediment and pollution monitor according to claim 4 wherein said thermostat activates a different one of said dispensing devices every time said temperature passes through one of a plurality of different preset levels.

6. An aquatic sediment and pollution monitor according to claim 1 wherein said marking means comprises:
    a housing;
    a rotatable magazine positioned within said housing, said magazine having a plurality of dispensing chambers therein each containing a marking material having a density greater than water;
    a passageway extending through said housing into said collecting tube for conducting said marking material thereinto, individual ones of said dispensing chambers being selectively registerable with said passageway depending upon the rotational position of said magazine; and means for periodically rotating said magazine to align a different one of said dispensing chambers with said passageway.

7. An aquatic sediment and pollution monitor according to claim 6 wherein said means for periodically rotating said magazine comprises:
a motor mounted within said housing;
a drive shaft connected between said motor and said magazine; and
means for periodically activating said motor.

8. An aquatic sediment and pollution monitor according to claim 7 wherein said means for periodically rotating said magazine further comprises:
a timing cam mounted on said drive shaft for rotation with said magazine, said timing cam having the same number and spacing of cogs thereon as the number and spacing of said dispensing chambers in said magazine;
stationary switch means for engaging said cogs on said timing cam; and
circuit means connected between said switch means and said activating means for de-activating said motor when said magazine has been rotated by a sufficient amount, as sensed by said switch means, to align the next dispensing chamber with said passageway.

9. An aquatic sediment and pollution monitor according to claim 7 wherein said means for activating comprises:
a conventional timer for activating said motor after a preset time interval.

10. An aquatic sediment and pollution monitor according to claim 7 wherein said means for activating comprises:
a thermostat positioned within said body of water for sensing changes in temperature thereof and for activating said motor when said temperature passes through at least one preset level.

11. An aquatic sediment and pollution monitor according to claim 10 wherein said thermostat activates said motor every time said temperature passes through one of a plurality of different preset levels.

12. An aquatic sediment and pollution monitor according to claim 1 further comprising:
means for mounting said collecting tube, said magnifying cone, said baffle means and said marking means on the bottom of said body of water and for supporting said collecting tube in a vertical position.

13. An aquatic sediment and pollution monitor adapted to be positioned in a body of water comprising:
an elongated, vertically alignable, collecting tube having an open upper end and a closed lower end;
a generally funnel-shaped magnifying cone positioned with the small diameter end thereof extending into said open end of said collecting tube, said collecting tube and said magnifying cone containing a preservative; and
baffle means positioned adjacent the large diameter end of said magnifying cone for minimizing turbulence in said collecting tube and for preventing entrance into said collecting tube of large organisms while allowing solids and small organisms to enter said collecting tube.

14. An aquatic sediment and pollution monitor adapted to be positioned in a body of water comprising:
an elongated, vertically alignable, collecting tube having an open upper end and a closed lower end;
a generally funnel-shaped magnifying cone positioned with the small diameter end thereof extending into said open end of said collecting tube; and
baffle means positioned adjacent the large diameter end of said magnifying cone for minimizing turbulence in said collecting tube and for preventing entrance into said collecting tube of large organisms while allowing solids and small organisms to enter said collecting tube, said baffle means comprising a multiplicity of elongated, side-by-side, hollow cells mounted vertically, adjacent said large diameter end of said magnifying cone.

15. An aquatic sediment and pollution monitor according to claim 14 wherein the length of each of said cells is at least twice the width thereof.

* * * * *